United States Patent [19]
Cao et al.

[11] Patent Number: 5,761,246
[45] Date of Patent: Jun. 2, 1998

[54] CIRCUIT FOR MULTIPLEXING A PLURALITY OF SIGNALS ON ONE TRANSMISSION LINE BETWEEN CHIPS

[75] Inventors: Tai Anh Cao; Satyajit Dutta; Thai Quoc Nguyen; Thanh Doan Trinh; Lloyd Andre Walls, all of Austin, Tex.

[73] Assignee: International Business Machines Corporation, Armonk, N.Y.

[21] Appl. No.: 514,633

[22] Filed: Aug. 14, 1995

[51] Int. Cl.⁶ .................. H04L 25/49; H04B 3/00
[52] U.S. Cl. ............. 375/287; 375/288; 375/219; 375/257; 375/317; 370/537
[58] Field of Search .................. 375/219, 257, 375/286–288, 317; 370/535, 537; 333/32; 326/30–31, 86

[56] References Cited

U.S. PATENT DOCUMENTS

| | | | |
|---|---|---|---|
| 3,832,494 | 8/1974 | Seim et al. | 370/211 |
| 4,595,923 | 6/1986 | McFarland, Jr. | 340/825.52 |
| 4,620,310 | 10/1986 | Lvovsky et al. | 375/288 |
| 4,916,657 | 4/1990 | Morton | 395/800 |
| 5,034,964 | 7/1991 | Khan et al. | 375/242 |
| 5,058,131 | 10/1991 | Thacker | 375/257 |
| 5,349,585 | 9/1994 | Soukal | 370/527 |
| 5,469,430 | 11/1995 | Guerin et al. | 370/297 |
| 5,539,846 | 7/1996 | Morikura et al. | 370/535 |

*Primary Examiner*—Young T. Tse
*Attorney, Agent, or Firm*—Kelly K. Kordzik; Winstead Sechrest & Minick P.C.; Anthony V. S. England

[57] ABSTRACT

The present invention allows for the simultaneous transmission of three digital signals from one integrated circuit to another. The three digital signals are encoded utilizing series resistors of predetermined values and are then transmitted by one transmission line to the second integrated circuit chip. The second integrated circuit chip decodes the first digital signal and then utilizes this decoded first digital signal to further decode the second digital signal, and then utilizes the decoded first and second digital signals to decode the third digital signal.

11 Claims, 4 Drawing Sheets

FIG. 4        $V_{104}$ = 0.355 volts
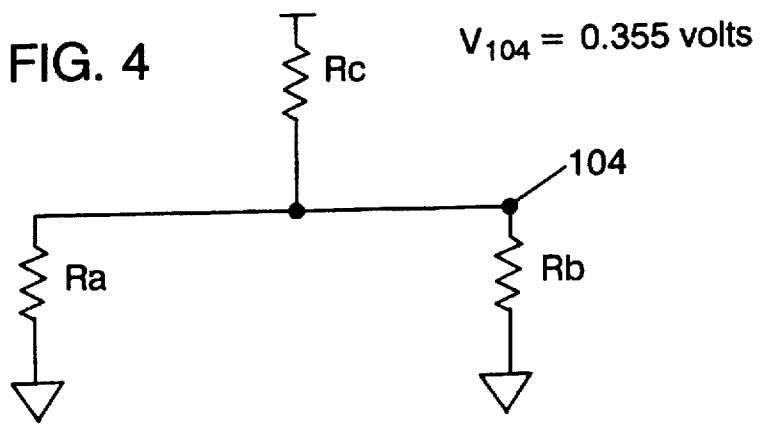
FIG. 5        $V_{104}$ = 0.71 volts
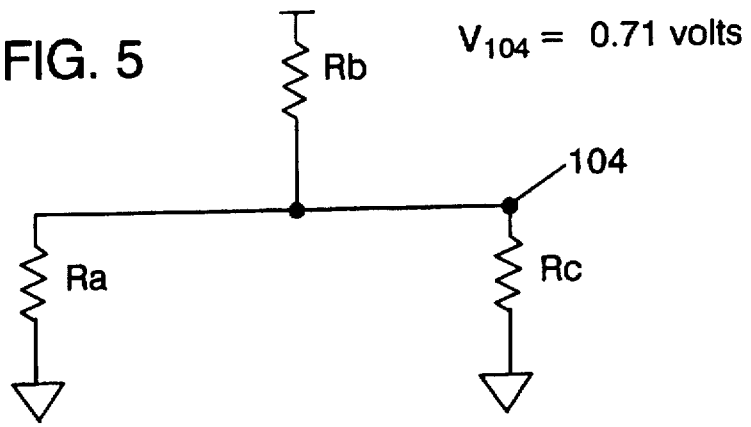
FIG. 6        $V_{104}$ = 1.06 volts
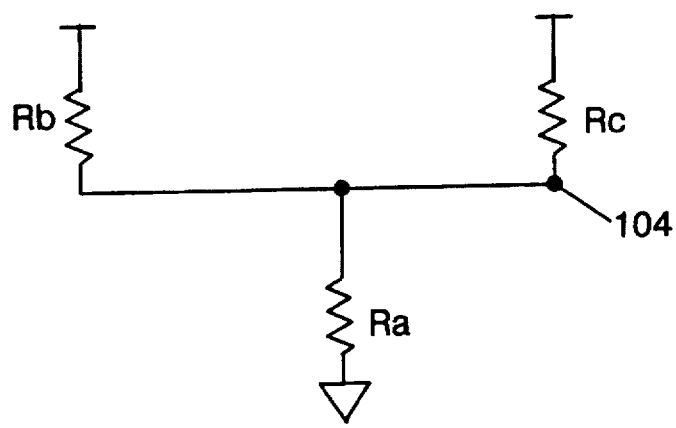

CIRCUIT FOR MULTIPLEXING A PLURALITY OF SIGNALS ON ONE TRANSMISSION LINE BETWEEN CHIPS

CROSS-REFERENCE TO RELATED APPLICATION

This application for patent is related to the following pending application for patent, which is assigned to a common assignee: U.S. patent application Ser. No. 08/387, 518, filed Feb. 13, 1995, entitled "CIRCUITRY FOR ALLOWING TWO DRIVERS TO COMMUNICATE WITH TWO RECEIVERS USING ONE TRANSMISSION LINE."

TECHNICAL FIELD OF THE INVENTION

The present invention relates in general to data communication, and in particular, to a system and method for permitting simultaneous communications between a plurality of drivers and a plurality of receivers using one transmission line.

BACKGROUND OF THE INVENTION

Generally, prior art circuitry has not permitted simultaneous unidirectional data communications between two separate integrated circuits ("chips") through the same transmission line provided between the chips. In other words, when communicating signals between circuitry implemented in separate chips, it has been required that for each separate transmission of a signal, there be a separate transmission line and corresponding connection circuitry, or that time division multiplexing be utilized in order that two or more separate signals be transmitted on the same transmission line between two chips.

Naturally, to implement time division multiplexing, additional complex circuitry is required. As a result, traditional system designs have had to settle for implementing separate transmission lines in order to support data communications in a simultaneous manner. However, it is generally desired when designing circuitry (for example, for computer systems) that the circuitry be simplified as much as possible. Therefore, it is desired to reduce the number of transmission lines between chips, along with the corresponding connection circuitry (e.g., driver, receiver, chip pins and signal pads).

The advancement in CMOS silicon chip technology has been dramatic. One result is that far more circuitry can be placed on a CMOS chip than can be accessed externally without performance degradation through the input/output ("I/O") connections. Thus, the problem arises that as technology increases the amount of circuitry on a chip, the ability to access that circuity from the external world becomes more difficult.

Thus, there is a need in the art for a circuit design that allows for the simultaneous transmission of separate data signals on one transmission line between chips.

SUMMARY OF THE INVENTION

The foregoing need is satisfied by the present invention, which implements encoding circuitry for receiving three digital signals, which encodes the three digital signals into one signal to be transmitted via a transmission path to a decoding circuitry, which decodes the one signal into the three digital signals. The first digital signal is decoded and then utilized to decode the second digital signal. The third digital signal is decoded using the first and second decoded digital signals.

Decoding of the first digital signal is performed by comparing the transmitted signal to a reference voltage. Decoding of the second digital signal is performed by utilizing the decoded first digital signal within a multiplexor to select between two predetermined voltages to send to a differential receiver for comparing the transmitted signal to the multiplexed signal to produce the decoded second digital signal. Likewise, the third digital signal is decoded by utilizing the first and second decoded digital signals within a multiplexor circuit in order to choose between four separate predetermined voltages to send to a differential receiver, which compares the transmitted signal from the other chip to the selected voltage to produce the third digital signal.

The encoding circuitry within the chip from which the three signals are transmitted includes specified resistor circuitry in order to transform each of the first, second and third digital signals into one of eight possible predetermined voltages, which is then transmitted along the transmission line between the chips.

The concepts of the present invention could be expanded to the multiplexing of N (where N is a positive integer) signals on one line. N is generally limited by the quality of the receiver.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIGS. 4–6 are illustrated for purposes of understanding how resistors Ra, Rb, and Rc are derived.

DETAILED DESCRIPTION OF A PREFERRED EMBODIMENT OF THE INVENTION

Figure 1:
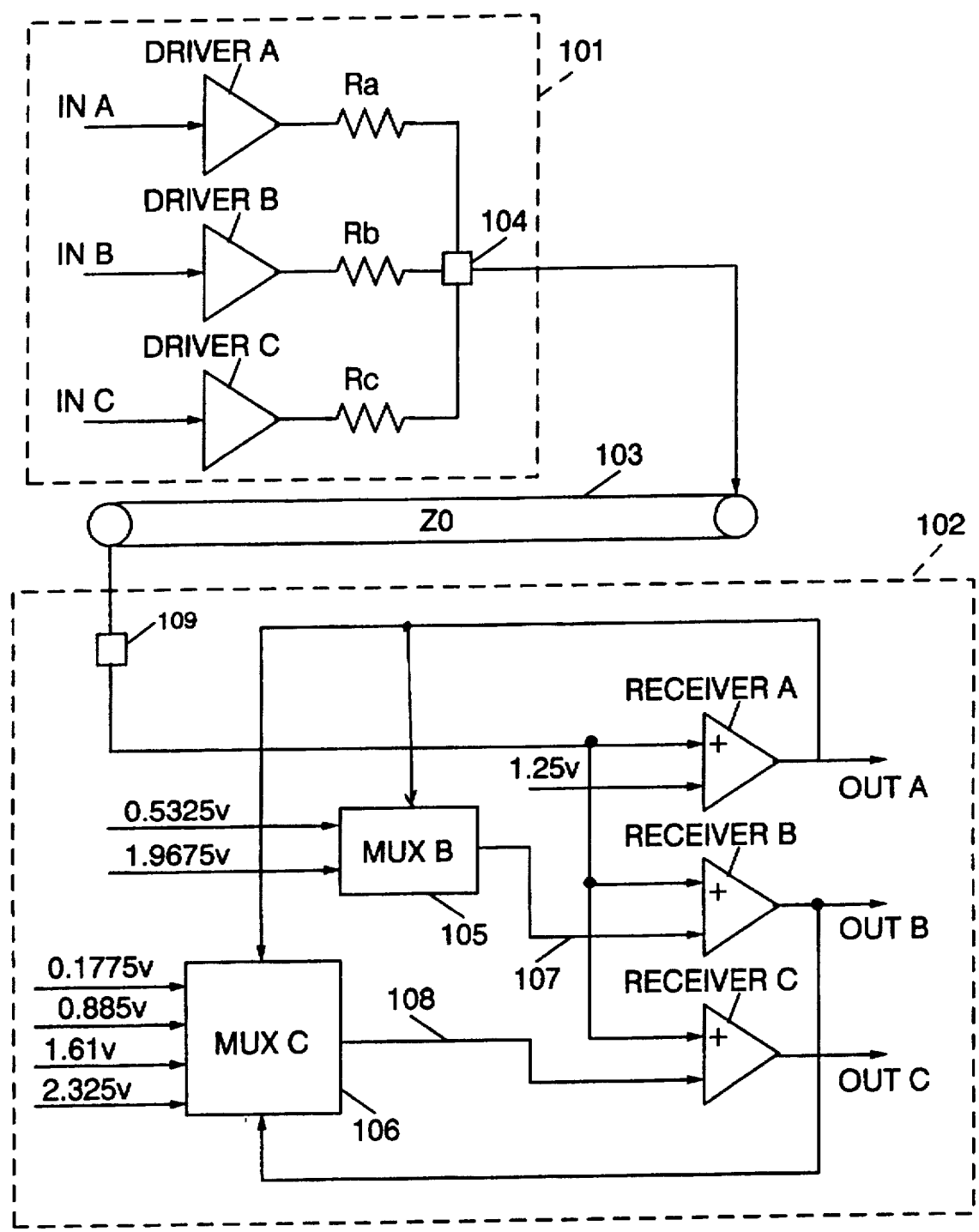
FIG. 1 illustrates a preferred embodiment of the present invention.

In the following description, numerous specific details are set forth such as voltages or component values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral to through the several views.

Referring to FIG. 1, there is illustrated a preferred embodiment of the present invention, which permits a simultaneous transmission of three separate digital signals (A, B, and C) to be communicated from chip 101 to chip 102. Chips 101 and 102 are preferably implemented with complimentary metal-oxide semi-conductor ("CMOS") circuitry, requiring a 2.5 volt supply for operation (Vcc=2.5 volts). Chips 101 and 102 may be portions of an overall circuit design for a system such as a computer. In such a design, it may be necessary for the circuitry implemented in chip 101 to communicate with the circuitry implemented in chip 102. As a result, digital signals will have to be transmitted from chip 101 to chip 102. As discussed above, it is almost always desired within circuit design to limit the number and complexity of components required to implement a design. The present invention assists in this goal by enabling the transmissions of three separate and distinct digital signals from chip 101 to chip 102 on a single transmission line 103. The use of the single transmission line 103 eliminates the need for three separate transmission for the three distinct digital signals, and also the corresponding signal pads and chip pins on both chips 101 and 102.

The transmit portion in chip 101 receives three logical input signals: A, B and C on lines IN A, IN B, and IN C, respectively, into off-chip chip drivers with appropriate power amplification shown as DRIVER A, DRIVER B and DRIVER C. The outputs of these drivers are coupled to series resistors Ra, Rb and Rc, respectively. All three resistors Ra, Rb and Rc are coupled to output pin 104.

Lines IN A, IN B and IN C are coupled to and received from other various circuitry (not shown) within chip 101. This circuitry within chip 101 requires that the three digital signals A, B and C be transmitted to circuitry (not shown) in chip 102. These digital signals are transmitted to chip 102 via transmission line 103, and are eventually decoded (as described below) so that digital signal A is routed to circuitry in chip 102 via output line OUT A, while digital signal B is routed to circuitry in chip 102 via output line OUT B, while digital signal C is routed to circuitry in chip 102 via output line OUT C.

Output pin 104 may represent the chip pin and/or signal pad coupling chip 101 to transmission line 103. Such a connection may be a solder-ball connection, commonly referred to in the industry as a C4 connection.

Transmission line 103 is similarly coupled to the circuitry within chip 102 at node 109, which may also be a C4 connection. Node 109 is coupled to the positive inputs to RECEIVER A, RECEIVER B, and RECEIVER C. These receivers are preferably typical differential amplifiers. The negative input to RECEIVER A is tied to a reference voltage of 1.25 volts. The negative input of RECEIVER B is tied to line 107, which is coupled to the output of multiplexor circuit MUX B 105. The negative input to RECEIVER C is coupled to line 108, which is coupled to the output of multiplexor circuit MUX C 106. The output OUT A from RECEIVER A is coupled to MUX B and MUX C to deliver decoded signal A. Similarly, the output OUT B from RECEIVER B is coupled to MUX C 106 to deliver decoded signal B. Digital signals A, B and C are delivered to circuitry (not shown) within chip 102.

For reasons set forth below, voltages of 0.5325 volts and 1.9675 volts are inputted to MUX B 105. Similarly, voltages of 0.1775 volts, 0.885 volts, 1.61 volts, and 2.325 volts are inputted to MUX C 106. All of the aforementioned reference voltages may be supplied by circuitry in a manner well-known to those skilled in the art.

The circuitry illustrated in FIG. 1 utilizes the reference voltage tied to RECEIVER A to decode digital signal A, and then uses digital signal A to decode digital signal B, and then uses digital signals A and B to decode digital signal C.

Referring to the table below, the resistor values Ra, Rb and Rc are selected so that predetermined voltages are transmitted from output pin 104 along transmission line 103 to chip 102 as a function of the logical levels of digital signals A, B and C.

| Digital Signal A | Digital Signal B | Digital Signal C | Output Pin 104 |
|---|---|---|---|
| 0 | 0 | 0 | 0 |
| 0 | 0 | 1 | 0.355 volts |
| 0 | 1 | 0 | 0.71 volts |
| 0 | 1 | 1 | 1.06 volts |
| 1 | 0 | 0 | 1.43 volts |
| 1 | 0 | 1 | 1.79 volts |
| 1 | 1 | 0 | 2.143 volts |
| 1 | 1 | 1 | 2.5 volts |

These values are predetermined by using a power supply voltage of 2.5 volts for the CMOS circuitry. It is assumed that the impedance of transmission line 103 is 50 ohms. For impedance matching, this 50 ohms must be matched using the following formula for the resistive values within the transmission section: 1/Ra+1/Rb+1/Rc. Empirically, the value for resistor Ra has been determined to be 87.5 ohms, the value for resistor Rb has been determined to be 175 ohms, and the resistive value for resistor Rc has been determined to be 350 ohms. Derivation of these resistor values is discussed in more detail below. These values will produce the voltages at output pin 104 as indicated in the above table. Note, other values of voltages and resistive values could be utilized to achieve the goal of the present invention.

The table shows that a unique voltage level is transmitted along transmission line 103 from chip 101 to chip 102 for each of the eight possible values (3 binary bits) consistent with proper source termination so that reflections are eliminated on the net. "Net" refers to a transmission line, such as for chip-to-chip communications (line 103) or from chip pin to another chip pin of another chip.

The table shows that for all logical 0 values for digital signal A, the voltage is 1.06 volts or less, and for all logical 1 values of signal A, the voltage on output pin 104 is 1.43 volts or greater. The average of 1.43 and 1.06 is 1.25. This is the value that is input to RECEIVER A in order to detect the logical level of digital signal A. Differential RECEIVER A used to output digital signal A only requires the composite input signal from output pin 104 along transmission line 103 and the 1.25 volt reference voltage inputted into the negative input of RECEIVER A in order to decode digital signal A. In other words, as shown in the table, for all voltages transmitted along transmission line 103 and received in the positive input of RECEIVER A having a voltage level less than 1.25 volts, the output of RECEIVER A will be a logical 0, which corresponds to the level of digital signal A inputted into driver A.

If the voltage transmitted along transmission line 103 and received at pin 109 is greater than 1.25 volts, RECEIVER A will output a logical 1 level, thus accurately recreating digital signal A as indicated in the above table.

As can be seen by the table, in order to decode digital signal B, digital signal A must first be decoded and then utilized in order to decode digital signal B. If digital signal A is a logical 0 level, then it can be determined that digital signal B is a logical 0 level for voltages less than 0.5325 volts (which is the average of 0.355 volts and 0.71 volts). A logical 1 level for digital signal B can be recreated when digital signal A has a logical 0 level, when it is detected that the signal along transmission line 103 is greater than 0.5325 volts. Likewise, when digital signal A is a logical 1 level, the dividing line for determining if digital signal B is a logical 0 or a logical 1 level is 1.9675 volts, which is the average of 1.79 volts and 2.143 volts.

Thus, to decode digital signal B, the signal received from transmission line 103 by RECEIVER B must be compared to either the 0.5325 volts or the above noted 1.9675 volts. These two reference voltages are inputted to MUX B 105, which utilizes the output of RECEIVER A, i.e., the decoded digital signal A, in order to choose between these two inputted voltages to send along line 107 to the negative input of differential RECEIVER B.

Figure 2:
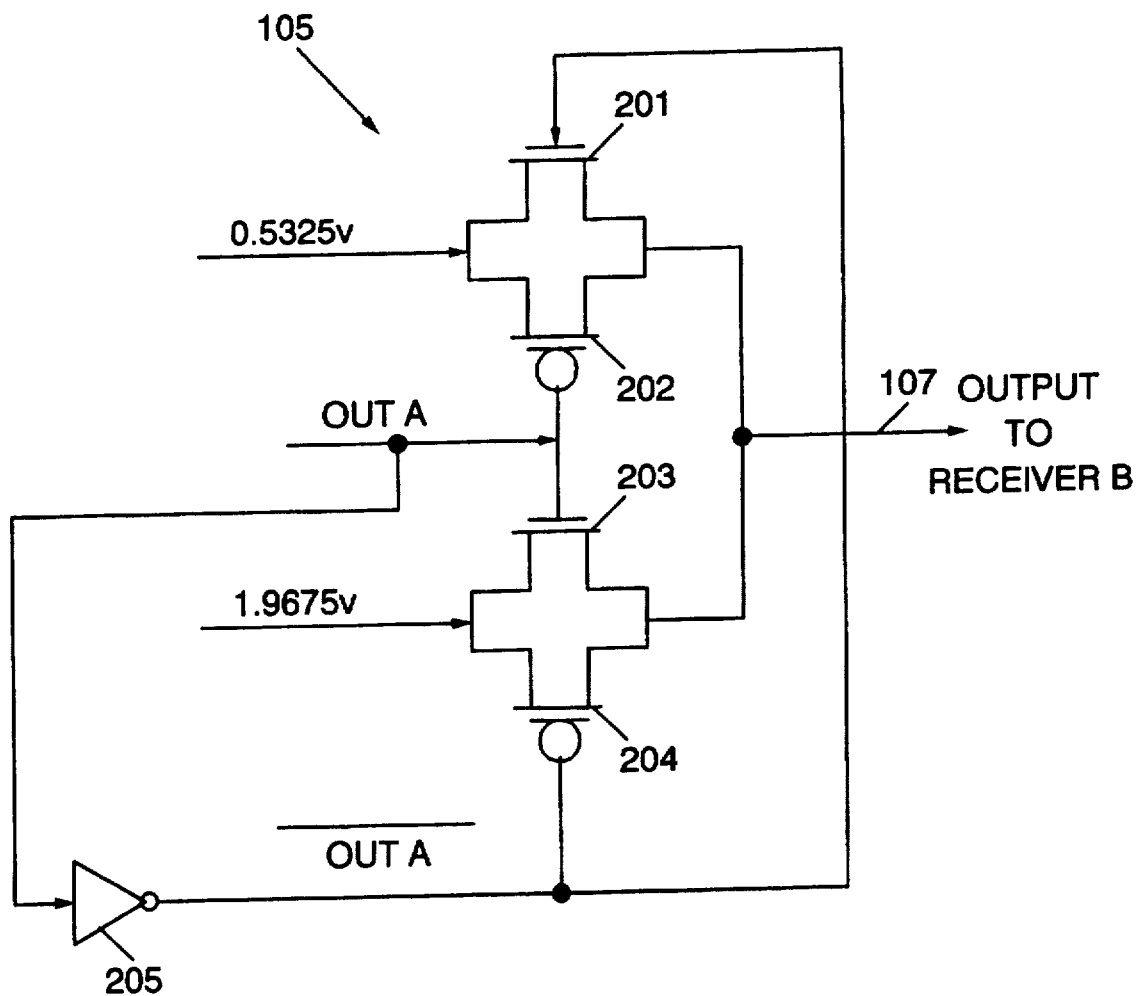
FIG. 2 illustrates a detailed diagram of Multiplexor B illustrated in FIG. 1.

Referring next to FIG. 2, there is illustrated a more detailed diagram of the circuitry for MUX B 105. MUX B 105 implements N-channel FETs (field effect transistors) 201 and 203 and P-channel FETs 202 and 204. The 0.5325 reference voltage is received by FETs 201 and 202, while the 1.9675 reference voltage is received by FETs 203 and 204. Digital signal A from OUT A is received by the gate electrodes to FETs 202 and 203, while the inverted digital signal A, which may be produced by inverting digital signal A with inverter 205, is received by the gate electrodes of devices 201 and 204.

Thus, if digital signal A as decoded by RECEIVER A, is a logical 0 value, then the reference voltage of 0.5325 volts will be passed through devices 201 and 202 to line 107 to be outputted to the negative input of RECEIVER B. If the voltage of the signal transmitted from chip 101 to chip 102 along transmission line 103 and received by the positive input of RECEIVER B is less than the 0.5325 reference voltage, then RECEIVER B will output a logical 0 for the decoded digital signal B, which corresponds to the above table. If the signal received from transmission line 103 is greater than the 0.5325 reference voltage, then RECEIVER B will output a logical 1 level, which also corresponds to the values depicted in the above table.

Should digital signal A be decoded as a logical 1 level, then devices 201 and 202 will be turned off, while devices 203 and 204 will pass through the reference voltage 1.9675 volts to line 107 to be outputted to the negative input of RECEIVER B. In a manner similar as discussed above, digital signal B is decoded by comparing this 1.9675 reference voltage to the signal received from transmission line 103 from chip 101. Should the receive signal be less than 1.9675 volts, then RECEIVER B will output a logical 0 level. If the received signal has a voltage level greater than 1.9675 volts, then RECEIVER B will output a logical 1 level. This corresponds to the values shown in the above table.

As can be seen from the table, in order to decode digital signal C, it is necessary to know the logical levels of digital signals A and B as they have been decoded by RECEIVERS A and B. For example, if it is known that decoded digital signal A is a logical 0 level, and decoded digital signal B is a logical 1 level, then a comparison needs to be made of the received signal from transmission line 103 with a reference voltage in order to decode digital signal C as either a logical 0 level or a logical 1 level.

Figure 3:
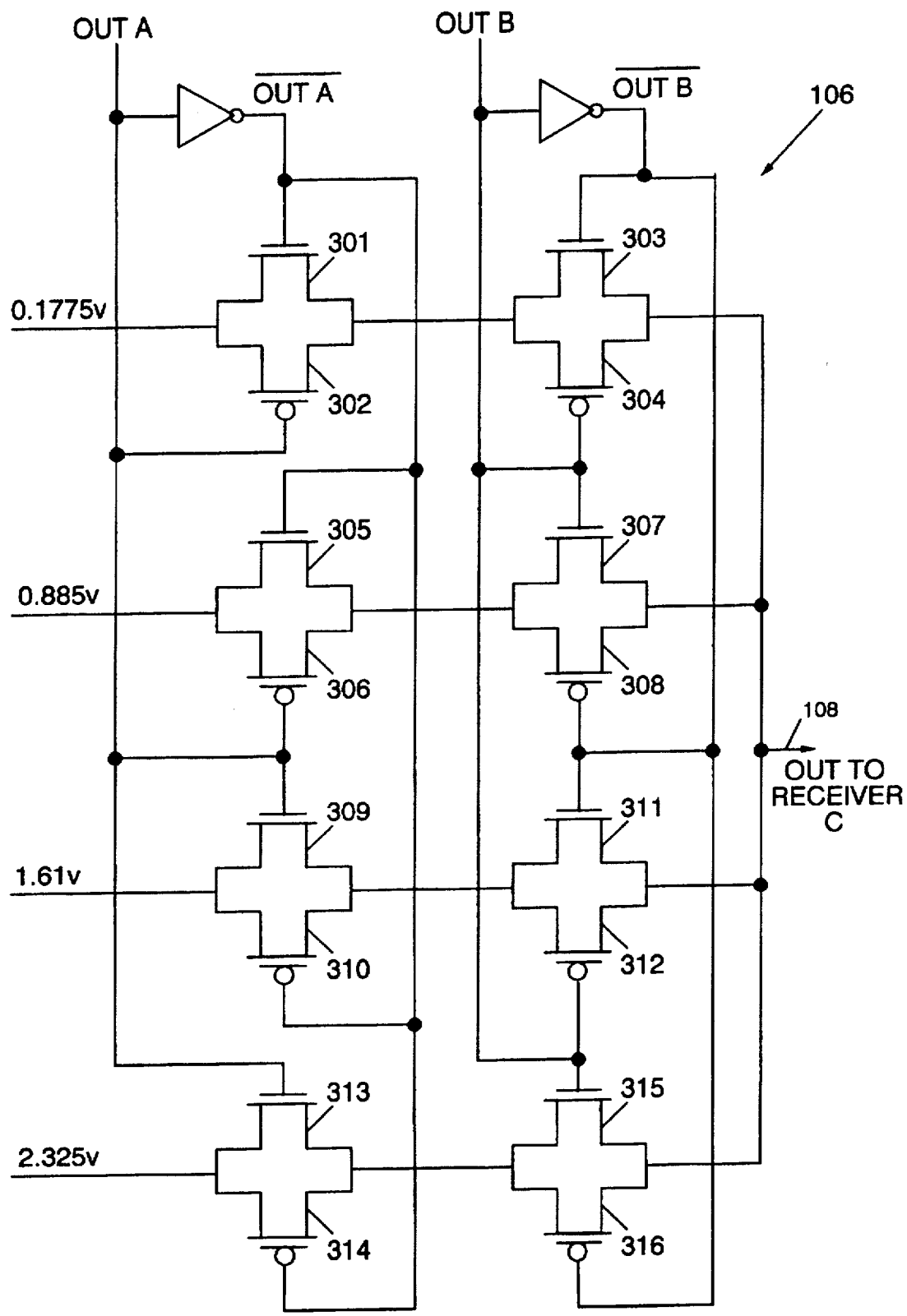
FIG. 3 illustrates a detailed diagram of Multiplexor C illustrated in FIG. 1.

The aforementioned is performed by MUX C 106, which is further detailed in FIG. 3. Circuit 106 is similar to circuit 105 in its utilization of N-FETs 301, 303, 305, 307, 309, 311, 313, and 315 and P-FETs 302, 304, 306, 308, 310, 312, 314, and 316.

Devices 301 and 302 receive a reference voltage of 0.1775 volts. Devices 305 and 306 receive a reference voltage of 0.885 volts. Devices 309 and 310 receive a reference voltage of 1.61 volts. Devices 313 and 314 receive a reference voltage of 2.325 volts. The drain electrodes of devices 301 and 302 are coupled to the source electrodes of devices 303 and 304. Likewise, the drain electrodes of devices 305 and 306 are coupled to the source electrodes of devices 307 and 308. Likewise, the drain electrodes of devices 309 and 310 are coupled to the source electrodes of devices 311 and 312. And, likewise, the drain electrodes of devices 313 and 314 are coupled to the source electrodes of devices 315 and 316. The drain electrodes of devices 303, 304, 307, 308, 311, 312, 315, and 316 are coupled to line 108, which is coupled to the negative input of RECEIVER C. The gate electrodes of devices 302, 306, 309 and 313 receive decoded digital signal A from OUT A. The gate electrodes of devices 301, 305, 310 and 314 receive the inverse of digital signal A which may be produced by the use of inverter 317.

Decoded digital signal B received from output OUT B of RECEIVER B is received by the gate electrodes of devices 304, 307, 312, and 315. The inverse of decoded digital signal B, which may be produced by inverting digital signal B through the use of inverter 318, is received by the gate electrodes of devices 303, 308, 311, and 316.

Using the above table, if digital signal A and digital signal B both have logical 0 levels, then devices 301, 302, 303, 304, 305, 306, 311, and 312 will be turned on. This will result in the passing of the referenced voltage of 0.1775 volts to line 108, which is then supplied to the negative input of RECEIVER C. If the voltage of the signal received from chip 101 along transmission line 103 is less than 0.1775 volts, then RECEIVER C will output a logical 0 level as decoded signal C. Should the voltage of the signal received on transmission line 103 be greater than 0.1775 volts, then RECEIVER C will output a logical 1 level. As can be seen by the above table, RECEIVER C through the use of MUX C 106 accurately produces digital signal C, since 0.1775 volts lies between a voltage level of 0 and a voltage level of 0.355 volts.

If decoded digital signal A is a logical 0 level, and decoded digital signal B is a logical 1 level, then devices 301, 302, 305, 306, 307, 308, 315, and 316 are turned on. This results in the passing of the reference voltage level 0.3875 volts to line 108, which is inputted to the negative input of RECEIVER C.

Likewise, as can be seen by the table and referring to FIG. 3, if decoded digital signal A is a logical 1 level and decoded digital signal B is a logical 0 level, then circuit 106 will pass through the voltage reference of 1.61 volts to line 108, which is then compared to the voltage of the signal received on transmission line 103. If the receive signal is less than 1.61 volts, then RECEIVER C will output a logical 0 level. In contrast, if the receive signal from transmission line 103 is greater than 1.61 volts, then RECEIVER C will output a logical 1 level.

Likewise, if both decoded digital signals A and B are logical 1 levels, then the reference voltage of 2.325 volts will be passed to line 108, which is coupled to the negative input of RECEIVER C, which allows RECEIVER C to decode digital signal C as is shown in the above table.

Derivation of Ra, Rb, Rc

Referring to the above table, because of rotational symmetry of Ra, Rb, and Rc, we need only to work with the first half of the table.

Case #1

The second line of the table states that when digital signal A=logic "0", digital signal B=logic "0", and digital signal C=logic "1", the voltage at Output Pin 104 is 0.355 volts. That corresponds to the case illustrated in FIG. 4.

Voltage divider principle yields the equation:

$$\frac{Ra//Rb}{Ra//Rb + Rc} \times Vdd = 0.355 \text{ volts} \quad (1)$$

$$\frac{Ra//Rb}{Ra//Rb + Rc} \times 2.5 = 0.355 \text{ volts} \quad (2)$$

$$\frac{\frac{Ra\,Rb}{Ra+Rb}}{\frac{Ra\,Rb}{Ra+Rb} + Rc} = \frac{1}{7} \quad (3)$$

$$\frac{Ra\,Rb}{Ra\,Rb + Ra\,Rc + Rb\,Rc} = \frac{1}{7} \quad (4)$$

Case #2

Similarly, the third line of the table leads to the following equations (see FIG. 5):

$$\frac{Ra//Rc}{Ra//Rc + Rb} \times 2.5 \text{ volts} = 0.71 \text{ volts} \quad (5)$$

$$\frac{Ra\,Rc}{Ra\,Rb + Ra\,Rc + Rb\,Rc} = \frac{2}{7} \quad (6)$$

Case #3

Similarly, the fourth line of the table leads to the following equations (see FIG. 6):

$$\frac{Ra}{Rb//Rc + Ra} \times 2.5 \text{ volts} = 1.06 \text{ volts} \quad (7)$$

$$\frac{Ra\,(Rb+Rc)}{Ra\,Rb + Ra\,Rc + Rb\,Rc} = \frac{3}{7} \quad (8)$$

Case #4

To match with transmission line impedance:

$$\frac{1}{Ra} + \frac{1}{Rb} + \frac{1}{Rc} = \frac{1}{Zo} \quad (9)$$

with $Zo = 50\Omega$, $$\frac{1}{Ra} + \frac{1}{Rb} + \frac{1}{Rc} = \frac{1}{50} \quad (10)$$

Solving for Ra, Rb, Rc

Now we have four equations of three unknowns. They are equations (4), (6), (8) and (10). They are repeated here for convenience:

$$\frac{Ra\,Rb}{Ra\,Rb + Ra\,Rc + Rb\,Rc} = \frac{1}{7} \quad (4)$$

$$\frac{Ra\,Rc}{Ra\,Rb + Ra\,Rc + Rb\,Rc} = \frac{2}{7} \quad (6)$$

$$\frac{Ra\,(Rb+Rc)}{Ra\,Rb + Ra\,Rc + Rb\,Rc} = \frac{3}{7} \quad (8)$$

$$\frac{1}{Ra} + \frac{1}{Rb} + \frac{1}{Rc} = \frac{1}{50} \quad (10)$$

Comparing equation (4) and (6) leads to the result:

$$Rc = 2\,Rb \quad (11)$$

Substitute $Rc=2\,Rb$ in equation (8):

$$\frac{Ra\,(3Rb)}{Ra\,Rb + 2Ra\,Rb + 2Rb^2} = \frac{3}{7} \quad (12)$$

$$\frac{Ra}{Ra + 2Ra + 2Rb} = \frac{1}{7} \quad (13)$$

$$\frac{Ra}{3Ra + 2Rb} = \frac{1}{7} \quad (14)$$

$$7Ra = 3Ra + 2Rb \quad (15)$$

$$4Ra = 2Rb \quad (16)$$

$$Ra = \frac{1}{2}\,Rb \quad (17)$$

To summarize equations (11) and (17):

$$Rc = 4\,Ra \quad (18)$$

$$Rb = 2\,Ra \quad (19)$$

Substituting equations (18) and (19) into equation (10):

$$\frac{1}{Ra} + \frac{1}{2Ra} + \frac{1}{4Ra} = \frac{1}{50} \quad (20)$$

$$\frac{1}{Ra}\left(1 + \frac{1}{2} + \frac{1}{4}\right) = \frac{1}{50} \quad (21)$$

$$\frac{1.75}{Ra} = \frac{1}{50} \quad (22)$$

$$Ra = 87.5\Omega \quad (23)$$

Equation (23) helps to solve for Rb and Rc:

$$Rb = 2\,Ra = 2(87.5) = 175\Omega \quad (24)$$

$$Rc = 4\,Ra = 4(87.5) = 350\Omega \quad (25)$$

So the values of Ra, Rb, and Rc should be:

Ra=87.5Ω

Rb=175Ω

Rc=350Ω

Although the present invention and its advantages have been described in detail, it should be understood that various changes, substitutions and alterations can be made herein without departing from the spirit and scope of the invention as defined by the appended claims.

What is claimed is:

1. A system for transmitting first, second, and third signals between first and second locations, said system comprising:

means at said first location for encoding said first, second, and third signals into a single transmission signal;

means for transmitting said single transmission signal from said first location to said second location on a single transmission path;

means at said second location for receiving said single transmission signal;

first means, coupled to said receiving means, for decoding said first signal from said single transmission signal;

second means, coupled to said receiving means, for decoding said second signal from said single transmission signal; and third means, coupled to said receiving means, for decoding said third signal from said single transmission signal, wherein said first decoded signal is used to decode said second signal from said single transmission signal, and wherein said decoded first and second signals are used to decode said third signal from said single transmission signal.

2. The system as recited in claim 1, wherein said encoding means comprises:

means for receiving said first signal;

a first driver circuit coupled to said means for receiving said first signal;

a first resistor coupled in series between said first driver circuit and said transmitting means;

means for receiving said second signal;

a second driver circuit coupled to said means for receiving said second signal;

a second resistor coupled in series between said second driver circuit and said transmitting means;

means for receiving said third signal;

a third driver circuit coupled to said means for receiving said third signal; and a third resistor coupled in series between said third driver circuit and said transmitting means.

3. The system as recited in claim 2, wherein said first, second, and third signals are digital signals, and wherein said encoding means encodes said digital signals into one of eight possible voltage levels for said single transmission signal in a manner dependent upon the binary values of each of said digital signals.

4. The system as recited in claim 1, wherein said first decoding means comprises:

a differential receiver for comparing said single transmission signal to a reference voltage in order to output said first signal.

5. The system as recited in claim 1, wherein said first and second locations are first and second chips.

6. A system for transmitting first, second, and third signals between first and second locations, said system comprising:

means at said first location for encoding said first, second, and third signals into a single transmission signal;

means for transmitting said single transmission signal from said first location to said second location on a single transmission path;

means at said second location for receiving said single transmission signal;

first means, coupled to said receiving means, for decoding said first signal from said single transmission signal;

second means, coupled to said receiving means, for decoding said second signal from said single transmission signal; and third means, coupled to said receiving means, for decoding said third signal from said single transmission signal, wherein said third decoding means comprises:

a multiplexor circuit for outputting one of four reference voltages in response to receipt of said first signal from said first decoding means and receipt of said second signal from said second decoding means; and a differential receiver for comparing said outputted one of four reference voltages to said single transmission signal in order to output said third signal.

7. A system for transmitting first, second, and third signals between first and second locations, said system comprising:

means at said first location for encoding said first, second, and third signals into a single transmission signal;

means for transmitting said single transmission signal from said first location to said second location on a single transmission path;

means at said second location for receiving said single transmission signal;

first means, coupled to said receiving means, for decoding said first signal from said single transmission signal;

second means, coupled to said receiving means, for decoding said second signal from said single transmission signal; and third means, coupled to said receiving means, for decoding said third signal from said single transmission signal, wherein said second decoding means comprises:

a multiplexor circuit for outputting one of two reference voltages in response to receipt of said first signal from said first decoding means; and means for sending said one of two reference voltages to a differential receiver, said differential receiver comparing said one of two reference voltages to said single transmission signal in order to output said second signal.

8. A system, comprising:

means for receiving in parallel first, second and third binary signals;

means, coupled to said receiving means, for encoding said received parallel binary signals into a single signal having one of eight voltage levels dependent upon bit values of said first, second and third binary signals, wherein said single signal has a first voltage level if said first binary signal has a 0 bit value, said second binary signal has a 0 bit value, and said third binary signal has a 0 bit value, wherein said single signal has a second voltage level if said first binary signal has a 0 bit value, said second binary signal has a 0 bit value, and said third binary signal has a 1 bit value, wherein said single signal has a third voltage level if said first binary signal has a 0 bit value, said second binary signal has a 1 bit value, and said third binary signal has a 0 bit value, wherein said single signal has a fourth voltage level if said first binary signal has a 0 bit value, said second binary signal has a 1 bit value, and said third binary signal has a 1 bit value, wherein said single signal has a fifth voltage level if said first binary signal has a 1 bit value, said second binary signal has a 0 bit value, and said third binary signal has a 0 bit value, wherein said single signal has a sixth voltage level if said first binary signal has a 1 bit value, said second binary signal has a 0 bit value, and said third binary signal has a 1 bit value, wherein said single signal has a seventh voltage level if said first binary signal has a 1 bit value, said second binary signal has a 1 bit value, and said third binary signal has a 0 bit value, and wherein said single signal has an eighth voltage level if said first binary signal has a 1 bit value, said second binary signal has a 1 bit value, and said third binary signal has a 1 bit value, wherein said receiving and encoding means are located in a first chip;

means for transmitting said single signal from said first chip to a second chip on a single transmission line; and means in said second chip for decoding said single signal into said first binary signal by comparing said single signal to a first reference voltage, wherein said first reference voltage has a voltage level between said fourth and fifth voltage levels.

9. The system as recited in claim 8, further comprising:

means in said second chip for selecting one of second and third reference voltages as a function of a bit value of said decoded first binary signal, wherein said second reference voltage has a voltage level between said second and third voltage levels, and wherein said third reference voltage has a voltage level between said sixth and seventh voltage levels; and means in said second chip for decoding said single signal into said second binary signal by comparing said single signal to said selected one of said second and third reference voltages.

10. The system as recited in claim 9, further comprising:

means in said second chip for selecting one of fourth, fifth, sixth and seventh reference voltages as a function of a bit value of said decoded first binary signal and as a function of a bit value of said decoded second binary signal, wherein said fourth reference voltage has a voltage level between said first and second voltage levels, and wherein said fifth reference voltage has a voltage level between said third and fourth voltage levels, and wherein said sixth reference voltage has a voltage level between said fifth and sixth voltage levels, and wherein said seventh reference voltage has a voltage level between said seventh and eighth voltage levels; and means in said second chip for decoding said single signal into said third binary signal by comparing said single signal to said selected one of said fourth, fifth, sixth and seventh reference voltages.

11. A method for transmitting first, second, and third signals between first and second locations, said method comprising the steps of:

at said first location, encoding said first, second, and third signals into a single transmission signal;

transmitting said single transmission signal from said first location to said second location on a single transmission path;

at said second location, receiving said single transmission signal;

at said second location, comparing said single transmission signal to a reference voltage;

at said second location, outputting said first signal in response to said step of comparing said single transmission signal to said reference voltage;

at said second location, selecting one of two reference voltages as a function of said outputted first signal;

at said second location, comparing said selected one of two reference voltages to said single transmission signal;

at said second location, outputting said second signal in response to said step of comparing said selected one of two reference voltages to said single transmission signal;

at said second location, selecting one of four reference voltages as a function of said outputted first signal and as a function of said outputted second signal;

at said second location, comparing said selected one of four reference voltages to said single transmission signal; and at said second location, outputting said third signal in response to said step of comparing said selected one of four reference voltages to said single transmission signal.

* * * * *